United States Patent [19]

Hanai et al.

[11] 3,928,747

[45] Dec. 23, 1975

[54] THERMAL PRINTING APPARATUS

[75] Inventors: Ichiro Hanai, Ichikawa; Kazuo Takahashi; Toshiharu Kobayashi, both of Tokyo, all of Japan

[73] Assignee: Sony Corporation, Tokyo, Japan

[22] Filed: Feb. 21, 1974

[21] Appl. No.: 444,571

[30] Foreign Application Priority Data

Feb. 23, 1973 Japan ............................... 48-21955
Feb. 27, 1973 Japan ............................... 48-23421
Nov. 27, 1973 Japan ............................. 48-133274

[52] U.S. Cl. ........... 219/216; 219/471; 346/74 MT; 360/16

[51] Int. Cl.² ........................................ H05B 1/00

[58] Field of Search .................... 219/216, 469–471; 250/317–319; 96/114.1; 355/104, 106, 107; 156/230, 238; 346/74 MT; 179/100.2 E; 360/16, 17, 59

[56] References Cited

UNITED STATES PATENTS 2,927,210 3/1960 O'Mara ........................... 355/106 X
3,195,455 7/1965 Newman ......................... 250/317 X
3,699,267 10/1972 Hoell ................................. 360/16
3,813,516 5/1974 Kudsi et al. ...................... 219/216 X

*Primary Examiner*—C. L. Albritton
*Attorney, Agent, or Firm*—Hill, Gross, Simpson, Van Santen, Steadman, Chiara & Simpson

[57] ABSTRACT

A thermal printing apparatus for magnetic tapes is disclosed which transfers information such as video information on a master tape to a slave tape. In general, the slave tape is heated to a temperature in the vicinity of its Curie point. After the slave tape is brought into contact with the master tape, it is separated from the master tape and cooled which fixed the information on the slave tape. With the invention, the temperature of the slave tape at the time of printing can be precisely controlled.

6 Claims, 4 Drawing Figures

THERMAL PRINTING APPARATUS

BACKGROUND OF THE INVENTION

1. Field of the Invention

This invention relates generally to a thermal printing apparatus for magnetic tapes, and more particularly to an improved thermal printing apparatus for magnetic tapes which maintains the temperature for thermal printing constant.

2. Description of the Prior Art

A conventional thermal printing apparatus for magnetic tapes prints information which is magnetically recorded on a master tape, onto a slave tape by bringing the tapes into contact with each other at a time when the coated layers of the slave tape are heated to a temperature in the vicinity of the Curie point.

The slave tape is coated with magnetic particles such as chromium dioxide ($CrO_2$) or gamma ferric oxide ($\gamma$-$Fe_2O_3$) particles which have two coercivity or remanence conditions which have a stable value of about 500 Oe. at the temperature lower than the Curie point $T_C$ (about 130°C) for the slave tape and an acutely sloping characteristic at a temperature in the vicinity of the Curie point $T_C$.

The master tape is coated with magnetic particles such as gamma ferric oxide ($\gamma$-$Fe_2O_3$) or Fe-Co alloy powder which has a gradually sloping remanence characteristic over a large temperature range below the Curie point $T'_C$ of the magnetic particles coated on the master tape.

The Curie point $T'_C$ of the particles coated on the master tape is higher than that of the particles on the slave tape. In the vicinity of the Curie point $T_C$, the difference in the coercivity or remanence between the two tapes is large and at this temperature the informations recorded on the master tape can be most effectively printed on the slave tape. Therefore, the temperature of the slave tape is heated by a heating device until it is accurately maintained in the vicinity of Curie point $T_C$.

However, there are many factors which may cause the temperature of the slave tape to vary. For example, the room temperature may change, and the speed of the tape transport mechanism may vary.

SUMMARY OF THE INVENTION

A main object of this invention is to provide a thermal printing apparatus which can maintain precisely the temperature of a medium coated on a slave tape in the vicinity of the Curie point $T_C$ at the time of or just before contact with a master tape.

Another object of the invention is to provide a thermal printing apparatus which can precisely maintain the temperature of the tape constant by controlling the heating device by the use of a detector.

A further object of the invention is to provide a thermal printing apparatus which can precisely maintain the temperature of the tape constant by controlling the transport speed of the slave tape with the use of a detector.

A further object of the invention is to provide a thermal printing apparatus which can precisely maintain the temperature constant by controlling the wrapping angle of the slave tape around the heating device.

The other objects, features and advantages of the invention will be apparent from the following description taken in conjunction with the accompanying drawings.

DESCRIPTION OF THE PREFERRED EMBODIMENTS

Figure 1:
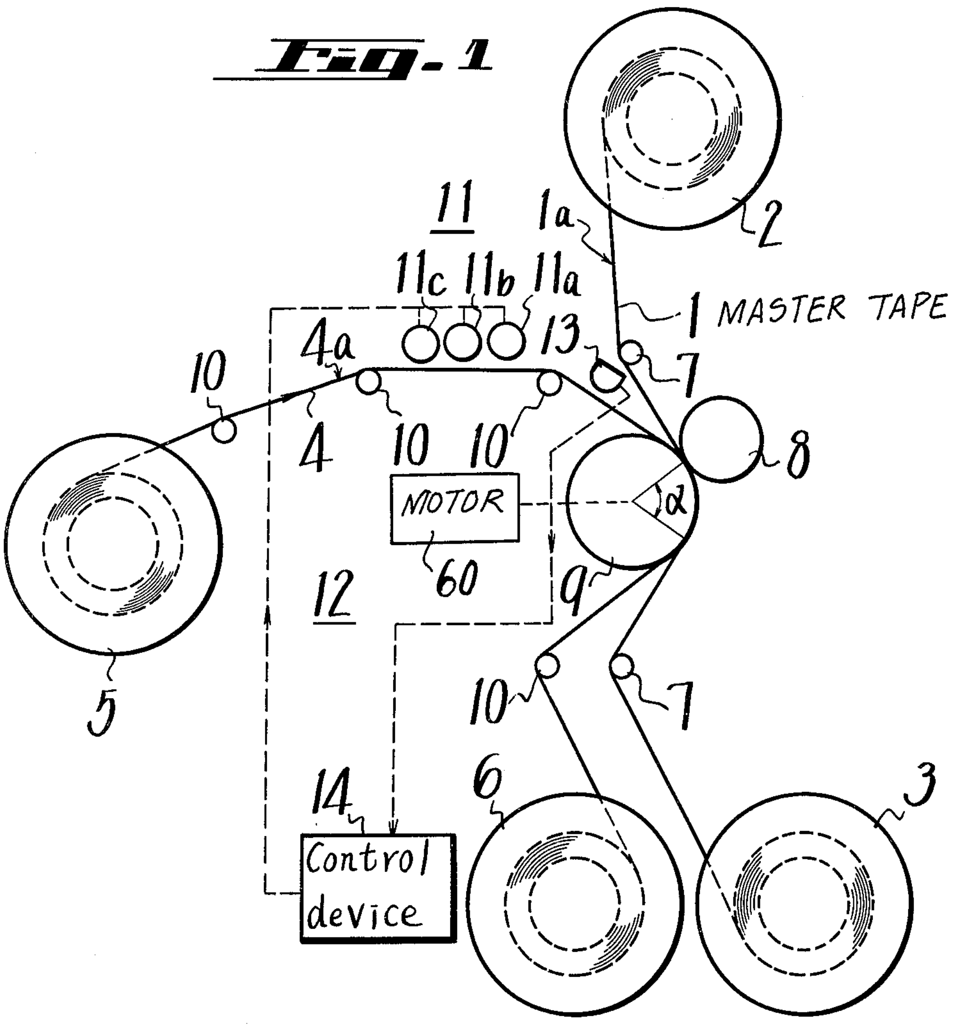
FIG. 1 is a schematic diagram showing an embodiment of the thermal printing apparatus in accordance with this invention.

FIG. 1 illustrates a master tape 1 which is coated with magnetic particles, such as, for example, gamma ferric oxide ($\gamma$-$Fe_2O_3$) on one surface 1a thereof. The master tape 1 extends between a supply reel 2 and a take-up reel 3. A slave tape 4 which is coated with magnetic particles such as, for example, chromium dioxide ($CrO_2$) on its one surface 4a extends between a supply reel 5 and a take-up reel 6.

Along the transport path of master tape 1 between the supply and take-up reels 2 and 3, there are disposed several tape guide pins 7 and cooperating rollers 8 and 9. Along the transport path of slave tape 4 between the supply and take-up reels 5 and 6 there are disposed several tape guide pins 10.

The slave tape 4 makes contact with the master tape 1 with the coated layers 4a and 1a facing each other partially around the outer periphery of roller 9. The rollers 8 and 9 serve not only to assure intimate mutual contact of tapes 1 and 4 but also help prevent slipping between the tapes 1 and 4 as well as slipping between the tapes and the rollers.

In this embodiment, the roller 8 is an idling roller, and the other roller 9 is driven by a motor 60 at a constant speed (about 5 meters per second at the periphery) for transporting the master and slave tapes 1 and 4, respectively, and serves to cool the slave tape 4 to a temperature of about 70°C after printing of the information on the slave tape 4 has been completed. The roller 9 is made of material with a high thermal conductivity and has a large mass for this purpose.

In order to cool the slave tape 4 more effectively, the slave tape 4 may be wrapped around the roller 9 for a predetermined angle $\alpha$ from the contact point between the master and slave tapes 1 and 4.

In the embodiment of FIG. 1, there is provided a heating device 11 consisting of, for example, three halogen lamps 11*a*, 11*b* and 11*c* which face the coating layer 4*a* of the slave tape 4 before the tape passes the rollers 8 and 9 so as to heat the slave tape 4 to a temperature in the vicinity of Curie point $T_C$ (about 140°C).

The heating device 11 is controlled to vary the heat energy for the slave tape 4 by a control apparatus 12. The control apparatus 12 has a temperature detecting device 13 mounted adjacent tape 4, which detects the temperature of the slave tape 4 at the coated surface 4*a*. A control device 14 receives an input from detector 13 and controls the supply of energy to the heating device 11 to control the temperature. The temperature detecting device 13 may be, for example, an infrared type thermometer, a tape guide with a conventional thermometer or the like, and is located between the heating device 11 and the rollers 8 and 9. If an infrared type thermometer is employed as the temperature detecting device 13, it is mounted adjacent the coated surface 4*a* of the slave tape 4. If a tape guide with an ordinary thermometer is employed as the temperature detecting device 13, it is mounted so as to contact with the slave tape 4.

Where halogen lamps 11*a*, 11*b* and 11*c* are used as the heating device 11, the control device 14 is connected in circuit to control the voltage supplied to the lamps 11*a*, 11*b* and 11*c*.

With the embodiment of the invention shown in FIG. 1, the temperature of the heated slave tape 4 at the time contact is made with the master tape 1 is automatically maintained constant at a temperature in the vicinity of the Curie point (about 140°C) even though temperature changes occur in the room where the equipment is mounted, or if the tape transport speed changes, and the printing of information recorded on the master tape 1 to the slave tape 4 will be effectively accomplished.

Figure 2:
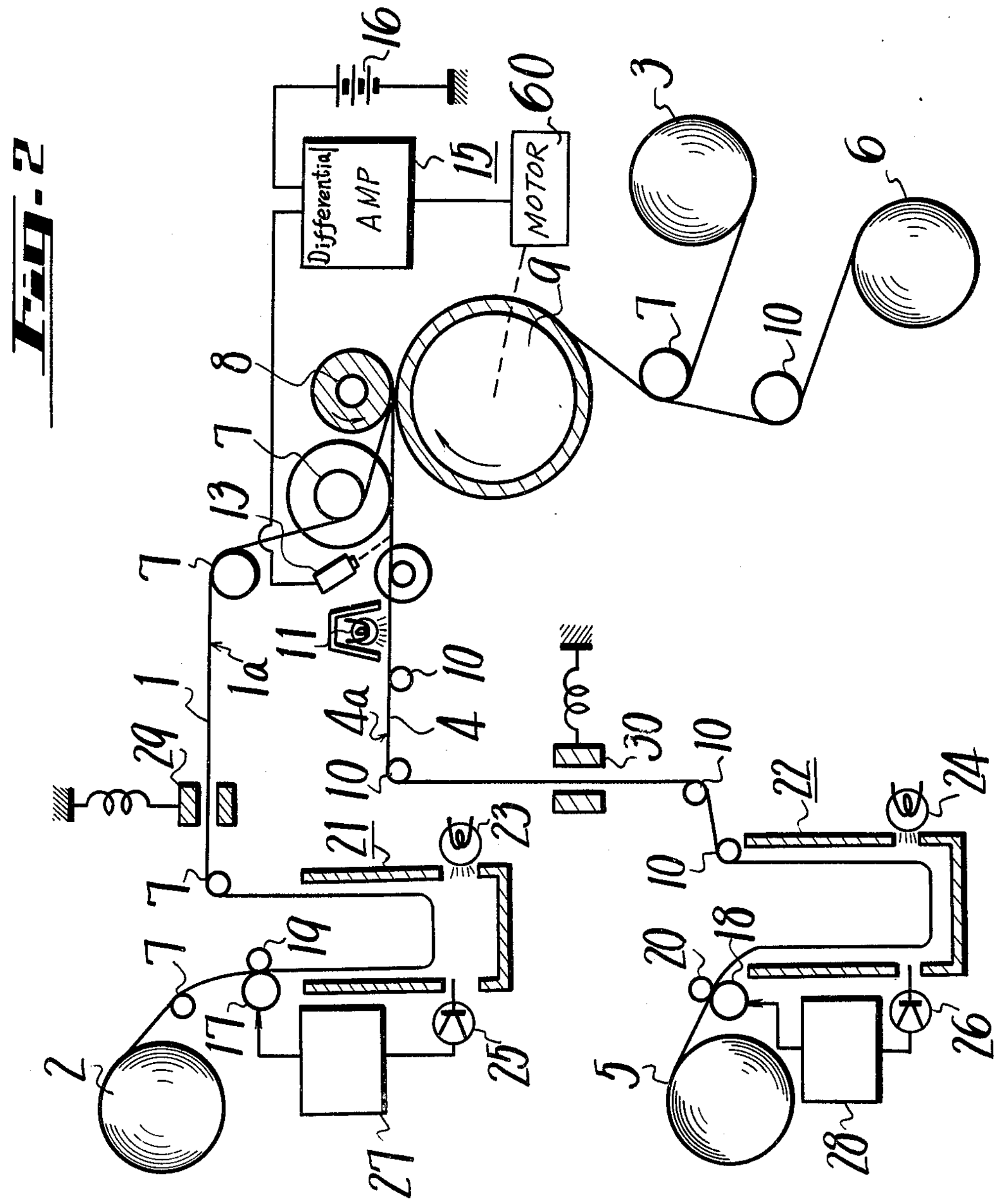
FIG. 2 is a schematic diagram showing a second embodiment of the invention.

A second embodiment of the invention is shown in FIG. 2 in which the reference numerals which are the same as those used in FIG. 1 designate the same elements.

In FIG. 2, the heating device 11 always supplies a constant amount of heating energy to the slave tape 4, but the tape transport speed of the slave tape 4 is controlled to maintain the tape temperature constant at the transfer or thermal printing of information point even if the room temperature changes and the like.

In the embodiment of FIG. 2, as in the case of the first embodiment the detecting device 13 which may be an infrared thermometer is located so as to detect the temperature of the slave tape 4 and its coated surface 4*a* at the point just before the transfer of information is performed from the master tape 1 to the slave tape 4. This is where the slave tape 4 makes contact with the rollers 8 and 9. The thermometer 13 applies a voltage which is a function of the surface temperature of the slave tape 4 to one input terminal of a differential amplifier 15. The other input terminal of the differential amplifier 15 receives a reference voltage from a DC voltage source 16. The reference voltage DC voltage source 16 can be set to a value corresponding to a desired reference temperature (about 140°C, for example). The differential amplifier 15 amplifies the voltage difference between the voltage generated by detector 13 and supplies a DC voltage proportional to the difference voltage to a DC motor 60 which drives the roller 9, and to control the rotational speed of the roller 9. Thus, the transport speed of the master and slave tapes 1 and 4 is controlled so as to maintain the proper temperature.

With the second embodiment of the invention, if the slave tape 4 is heated by the heating device 11 to a temperature higher than the reference temperature, the surface temperature of the slave tape 4 will be detected by the thermometer 13 and it will apply a voltage proportional to the detected temperature to the differential amplifier 15 which will be compared with the reference voltage. The voltage proportional to the increased surface temperature of the slave tape 4 will be applied to the DC motor 60 which will drive the roller 9 faster and consequently the transport speed of the master and slave tapes 1 and 4 will be increased. Thus, the time during which the slave tape 4 is heated by the heating device 11 will be shortened, and the surface temperature of the slave tape 4 will be lowered until the output of the detector 13 equals the reference voltage and the surface temperature will be maintained constant during the transfer of information.

If the surface temperature of the slave tape 4 becomes lower than the reference temperature, the differential amplifier 15 will apply a voltage proportional to the lower surface temperature of the slave tape 4 to the DC motor 60 to slow its rotational speed and hence to decrease the transport speed of the slave tape 4. Thus, the time during which the slave tape 4 is heated by the heating device 11 is increased and the surface temperature of slave tape 4 will increase until the output of the detector 13 equals the reference voltage and the temperature will be kept constant during transfer of information.

In the second embodiment of the invention shown in FIG. 2, capstans 17 and 18 are provided near the supply reels 2 and 5 of the master and slave tapes 1 and 4. Pinch rollers 19 and 20, respectively, press the tapes against capstans 17 and 18. When the capstans 17 and 18 are driven by a motor (not shown, they supply the master and slave tapes 1 and 4 with the pinch rollers 19 and 20, respectively. A pair of light emitting elements such as a lamp 23 and a photoelectric conversion element such as a phototransistor 25 are provided outside the case 21 near the bottom, such that the lamp 23 and phototransistor 25 oppose with each other through apertures formed in the opposed side walls of case 21. A lamp 24 and a phototransistor 26 similarly oppose each other through apertures formed in the opposed side walls of case 22.

The output signals from phototransistors 25 and 26 are amplified in amplifiers 27 and 28, respectively, and applied to the motor which drives the capstans 18 and 19. Thus, when the light is emitted from the lamps 23 and 24 and passes to the phototransistors 25 and 26 through the apertures is interrupted by the tapes 1 and 4 in the cases 21 and 22, the motor will be controlled so as to make the rotational speed of the capstans 17 and 18 slower and hence the transport speed of tapes 1 and 4 from the supply reels 2 and 5 will be lowered. When the light from the lamps 23 and 24 to phototransistors 25 and 26 is not interrupted by the tapes 1 and 4, the rotational speed of capstans 17 and 18 will be controlled so as to be relatively high. Thus, the transport speed of tapes 1 and 4 are maintained substantially constant. In other words, the master and slave tapes 1 and 4 are maintained free of tension from the supply reels 2 and 5 and tension pads 29 and 30. The tapes 1 and 4, which are supplied from the supply reels 2 and 5, are stored in the tape storage cases 21 and 22 with no tension, respectively, and are then transported to the take-up reels 3 and 6 through the tension pads 29 and 30 for applying a constant tension to the tapes as it passes the rollers 8 and 9 and travels on.

Thus, with the second embodiment of the invention, the tape transport speed can be accurately controlled.

Figure 3:
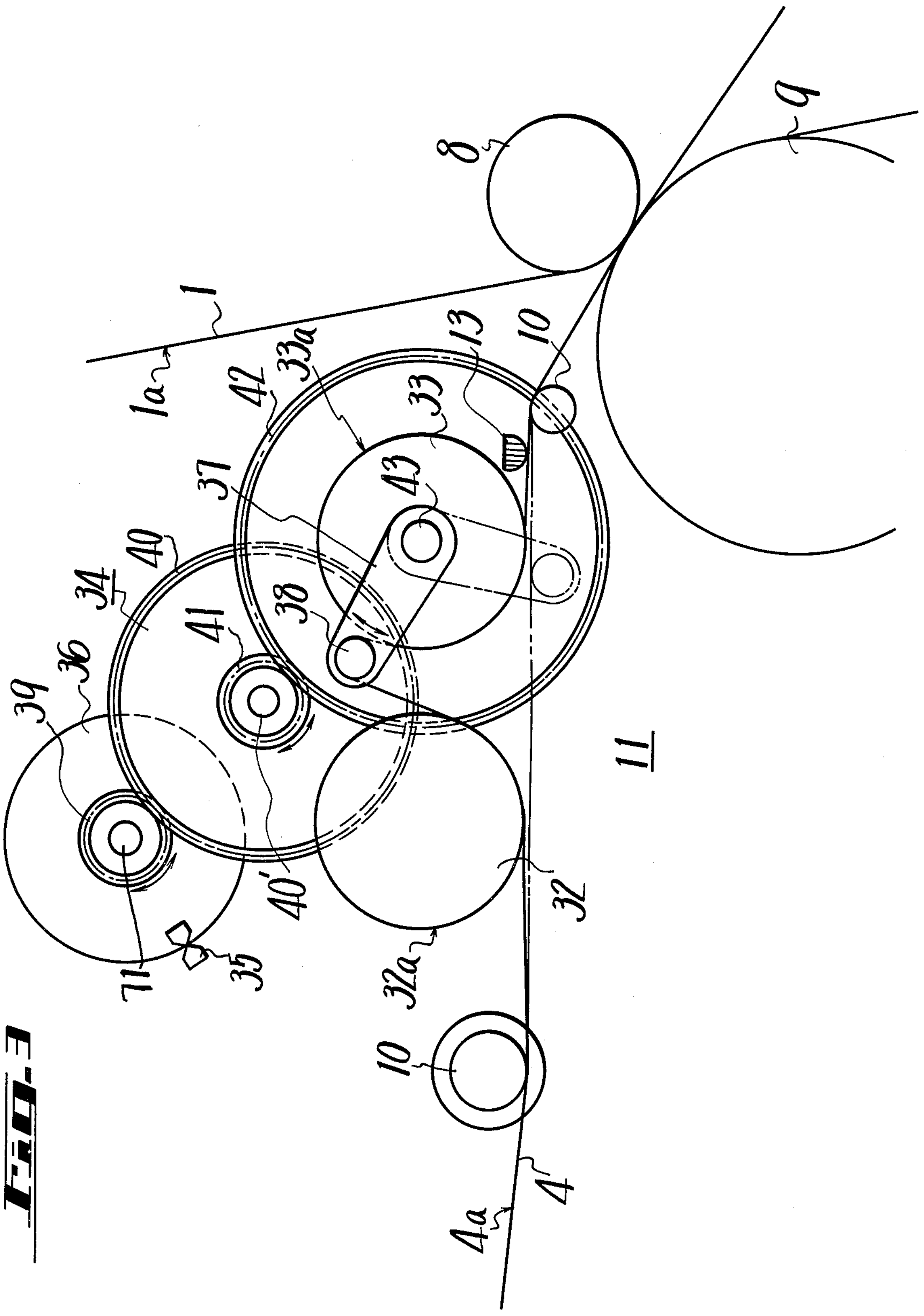
FIG. 3 is a schematic diagram showing the main parts of a third embodiment of the invention in enlarged scale.

A third embodiment of the invention is shown in FIG. 3 in enlarged scale. In FIG. 3, the parts corresponding to those of the first and second embodiments of FIGS. 1 and 2 are shown with the same reference numerals. Parts not shown in FIG. 3 are substantially the same as those of the embodiments of FIGS. 1 and 2.

In the third embodiment of FIG. 3, heating of the slave tape 4 can be adjusted and the slave tape 4 can be automatically moved away from the heating device 11 when transfer or printing of information from the master tape 1 to the slave tape 4 is discontinued.

In the third embodiment shown in FIG. 3, the heating device 11 consists of a pre-heating roller 32 and a heating roller 33. A tape transport path changing device 34 is provided for the slave tape 4. The tape transport path changing device 34 acts to adjust the amount of heat applied to the slave tape 4 as it travels in contact with the pre-heating and heating rollers 32 and 33.

A motor 36 drives the device 34 and related mechanisms. A speed detector 35 monitors the speed of the motor 36.

The tape transport path changing device 34 consists of a pivotally spaced arm 37 on shaft 43 which carries a pin 38 on one end. The pin 38 engages the slave tape 4. A gear 40 is mounted on a shaft 40′ and meshes with a gear 39 mounted on the output shaft 71 of motor 36. A gear 41 is attached to the shaft 40′ and meshes with a gear 42 attached to shaft 43. The heating roller 33 is mounted on the shaft 43 and the arm 37 has its outer end portion attached to shaft 43. The pre-heating roller 32 heats the slave tape 4 such that the temperature of its magnetic coating material 4a reaches a temperature of about 80°C.

The arm 37 and pin 38 will be moved from the position shown in solid line to the position shown by the two-dot chain line when the transport of slave tape 4 is stopped. Thus, the slave tape 4 will move to the position shown by the two-dot chain line in FIG. 3 and will be separated from both the pre-heating and heating rollers 32 and 33 and will not heat at such times.

When the apparatus is operated and the tape 4 is being moved, as will be described later, the arm 37 is rotated in the clockwise direction for a certain angle by the shaft 43 and the pin 38 will engage the slave tape 4, and will move the slave tape 4 such that it engages the surface of the rollers 32 and 33 about a portion of their peripheries.

A temperature detecting device 13 for the slave tape 4, which is substantially the same as that used in the first embodiment, is mounted adjacent the tape 4 between the heating roller 33 and the guide roller 10 ahead of the rollers 8 and 9.

Figure 4:
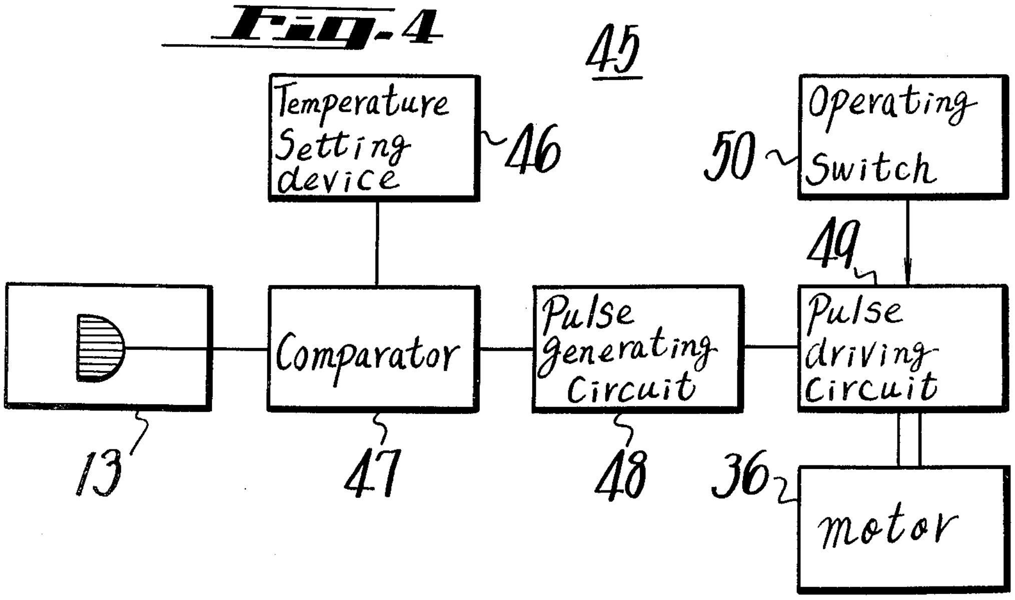
FIG. 4 is a block diagram showing a servo mechanism used in the third embodiment shown in FIG. 3.

As shown in FIG. 4, a servo mechanism 45 is driven by the temperature detecting device 13 and the DC motor 36 in the third embodiment. The servo mechanism 45 includes a comparator 47 which receives the output of the detecting device 13. A temperature setting device 46 also supplies an input to comparator 47 for setting a predetermined heating temperature of slave tape 4. A pulse generating circuit 48 is connected to the output side of the comparator 47. A pulse driving circuit 49 is supplied with the output of the pulse generating circuit 48.

It is, of course, to be realized that arm 37 and pin 38 can be moved manually rather than through the servo system.

An operating switch 50 is connected to the pulse driving circuit 49 and when this switch is on, the apparatus operates to move the arm 37 by rotating it clockwise for a predetermined angle through the servo mechanism 45 which causes motor 36 to move arm 37 and bring the slave tape 4 into contact with the preheating and heating rollers 32 and 33 for the predetermined angular range. Thus, the slave tape 4 will be heated to the predetermined temperature when it contacts the master tape 1. When the switch 50 is opened, the tape will be moved out of engagement with rollers 32 and 33. The arm 37 will be rotated in the counterclockwise direction by the servo mechanism 45 to cause the slave tape 4 to separate from the preheating and heating rollers 32 and 33 as shown in FIG. 3 by the two-dot chain line.

With the third embodiment of the invention, if the switch 50 is pushed when the apparatus is in the stopped state, and the slave tape 4 is in the position shown by the two-dot chain line in FIG. 3, the servo mechanism 45 will operate to drive the motor 36. The arm 37 will be rotated clockwise through the predetermined angle and the slave tape 4 will engage the surfaces of the pre-heating and heating rollers 32 and 33 for the predetermined angular range and will be heated. The temperature detecting device 13 detects the temperature of the slave tape 4 after it has been heated by the rollers 32 and 33. The detected temperature of the slave tape 4 is compared with the set temperature by the setting device 46 in the comparator 47. Any temperature difference is converted to a pulse signal by the pulse generating circuit 48 which is then fed to the motor 36 through the pulse driving circuit 49. When the temperature for which the slave tape 4 has been heated is higher than the set temperature, the motor 36 will be driven to rotate the arm 37 in the counterclockwise direction and decrease the angular contact area of the slave tape 4 with the rollers 32 and 33 which will lower the temperature of the tape. If the temperature to which the tape has been heated is lower than the set temperature, the motor 36 will be operated in the opposite direction to increase the angular contact area of the tape 4 with rollers 32 and 33 which will increase the temperature of the tape.

If the switch 50 is opened, the apparatus will return to the stopped state. Then the arm 37 will be rotated counterclockwise by the servo mechanism 45 to the position shown in FIG. 3 by the two-dot chain line.

With the third embodiment of the invention, the slave tape 4 is pre-heated by the pre-heating roller 32 and it will be uniformly heated. The heating capacity of the heating device 33 can be reduced and hence the heating device can be made compact. Since the temperature to which the slave tape is heated is automatically maintained at the predetermined value, the information on the master tape can be effectively transferred or printed onto the slave tape.

It will be apparent that many modifications and variations could be effected by those skilled in the art without departing from the spirit and scope of the novel concepts of the present invention.

We claim as our invention:

1. A thermal printing apparatus comprising:

a. means for transporting a master tape on which information is magnetically recorded;

b. means for transporting a slave tape;

c. means for bringing said master and slave tapes into contact with each other so as to print said information on said master tape onto said slave tape;

d. means for heating said slave tape to a temperature in the vicinity of the Curie point before said contact is made;

e. detecting means mounted between said heating means and said contacting means for detecting the temperature of said heated slave tape;

f. means for controlling the temperature of said heated slave tape as a function of the output of said temperature detecting means; and g. in which said heating means is controlled by said control means by the output of said temperature detecting means.

2. A thermal printing apparatus for printing a slave tape from a master tape comprising:

a slave tape, a master tape, means for bringing said slave tape into contact with said master tape;

temperature detecting means mounted so as to monitor the temperature of said slave tape at a point just before said slave tape is brought into contact with said master tape;

heating means adjacent said slave tape to heat it to a temperature near the Curie point before said slave tape passes said temperature detecting means; and a control device receiving the output of said detecting means and connected to said heating means to control it to maintain the temperature of said slave tape at the desired temperature.

3. A thermal printing apparatus according to claim 2, wherein said heating means comprises infrared heaters.

4. A thermal printing apparatus for printing a slave tape from a master tape comprising:

a slave tape, a master tape, means for bringing said slave tape into contact with said master tape to print it;

temperature detecting means mounted so as to monitor the temperature of said slave tape at a point just before said slave tape is brought into contact with said master tape;

a heating means mounted adjacent said detecting means;

control means receiving the output of said detecting means and controlling the distance between said slave tape and said heating means; and wherein said heating means comprises a heated roller and said control means includes a guide pin engageable with said slave tape and movable to control the length of peripheral contact between said heated roller and said slave tape.

5. A thermal printing apparatus for printing a slave tape from a master tape comprising:

a slave tape, a master tape, means for bringing said slave tape into contact with said master tape to print it;

temperature detecting means mounted so as to monitor the temperature of said slave tape at a point just before said slave tape is brought into contact with said master tape;

a heating means mounted adjacent said detecting means;

control means receiving the output of said detecting means and controlling the distance between said slave tape and said heating means; and including a second heated roller, and said guide pin also controlling the length of peripheral travel between said second heated roller and said slave tape.

6. A thermal printing apparatus according to claim 5, wherein said guide pin is mounted on a pivotally supported arm and said control means includes a motor means connected to position said arm.

* * * * *